Oct. 24, 1950 F. HARNESS 2,526,817
CHANGEABLE EXHIBITOR
Filed Feb. 5, 1947 10 Sheets-Sheet 1
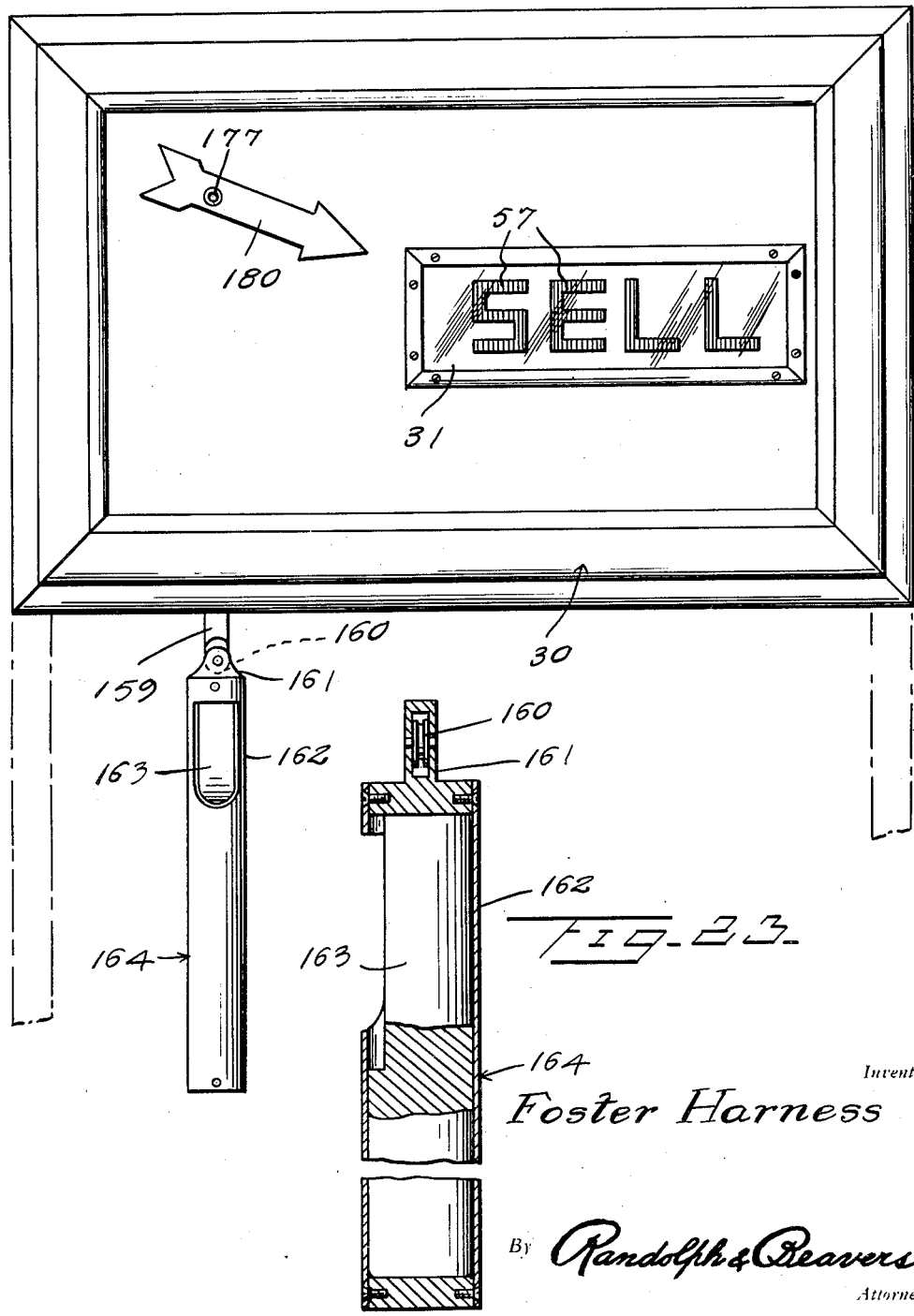
Inventor
Foster Harness
By Randolph & Beavers
Attorneys Oct. 24, 1950        F. HARNESS        2,526,817
CHANGEABLE EXHIBITOR
Filed Feb. 5, 1947        10 Sheets-Sheet 2
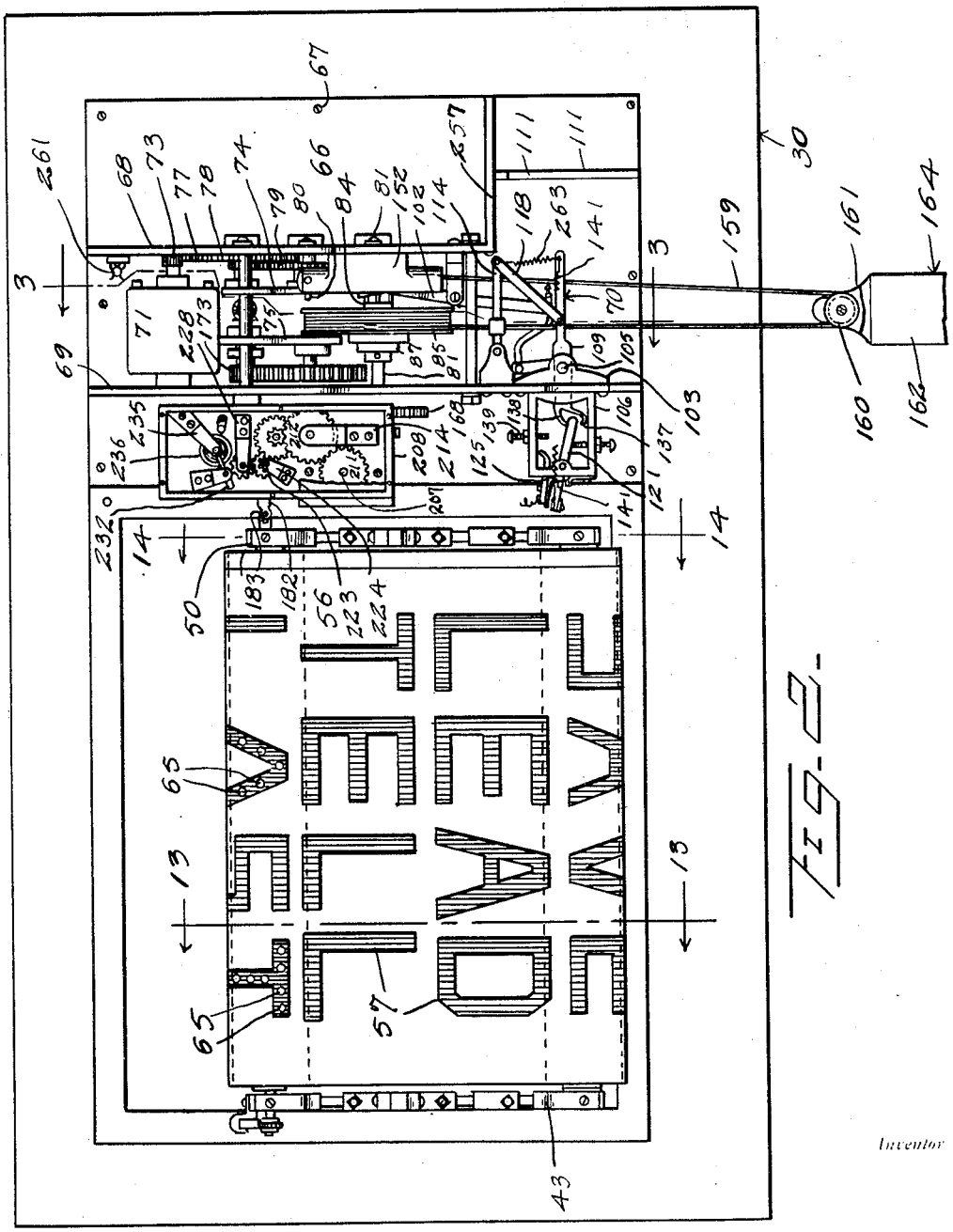
Inventor
Foster Harness
By Randolph & Beavers
Attorneys

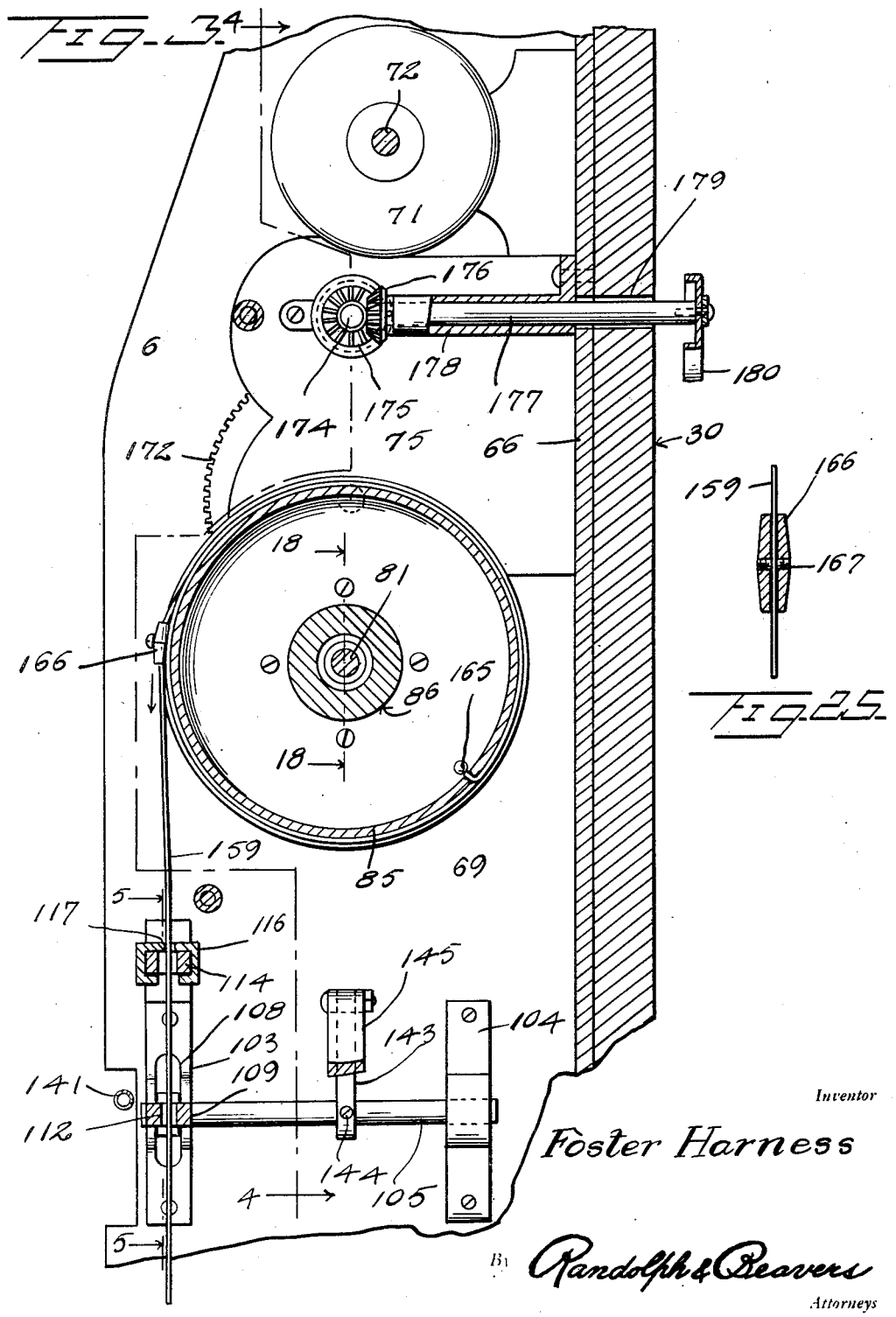

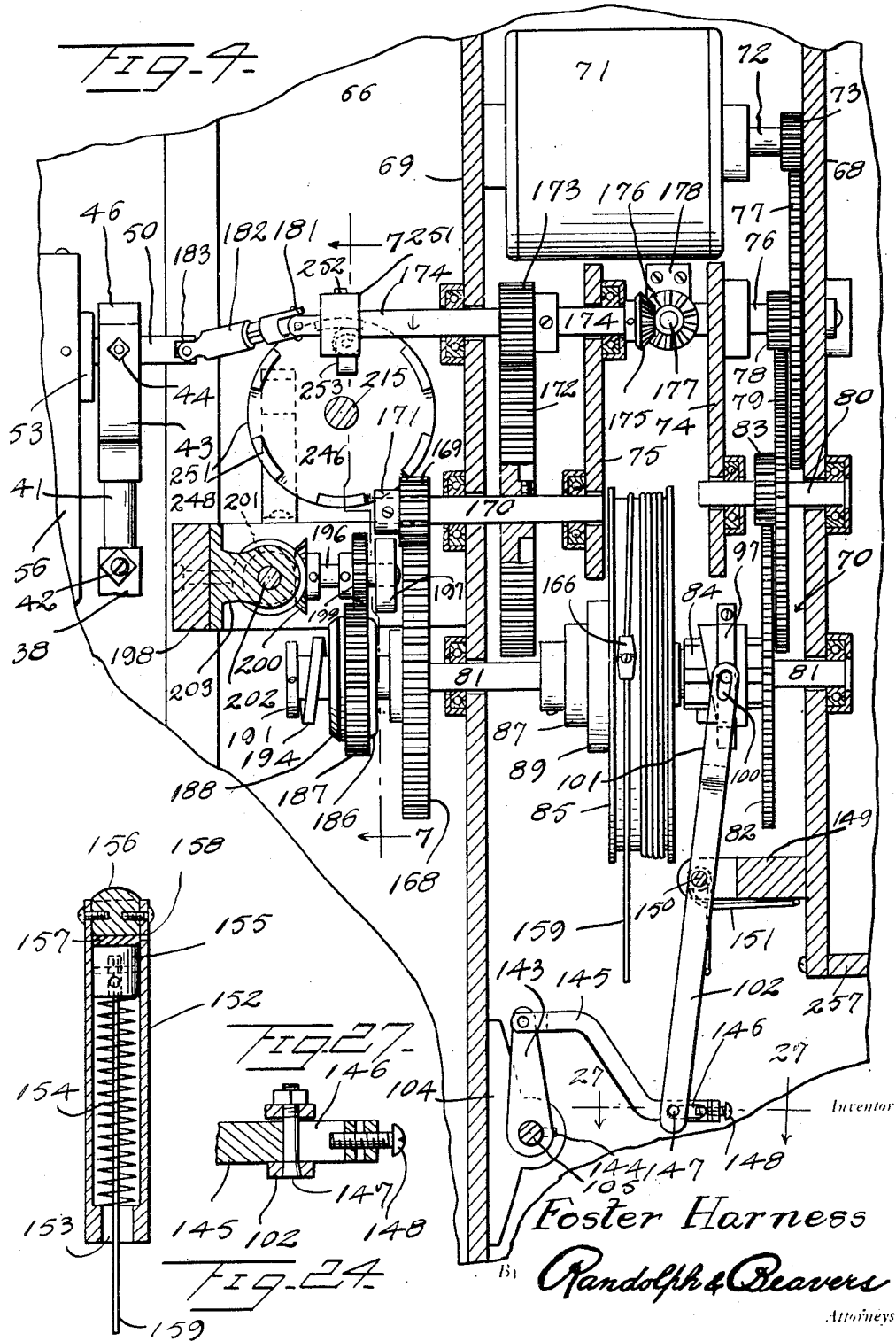

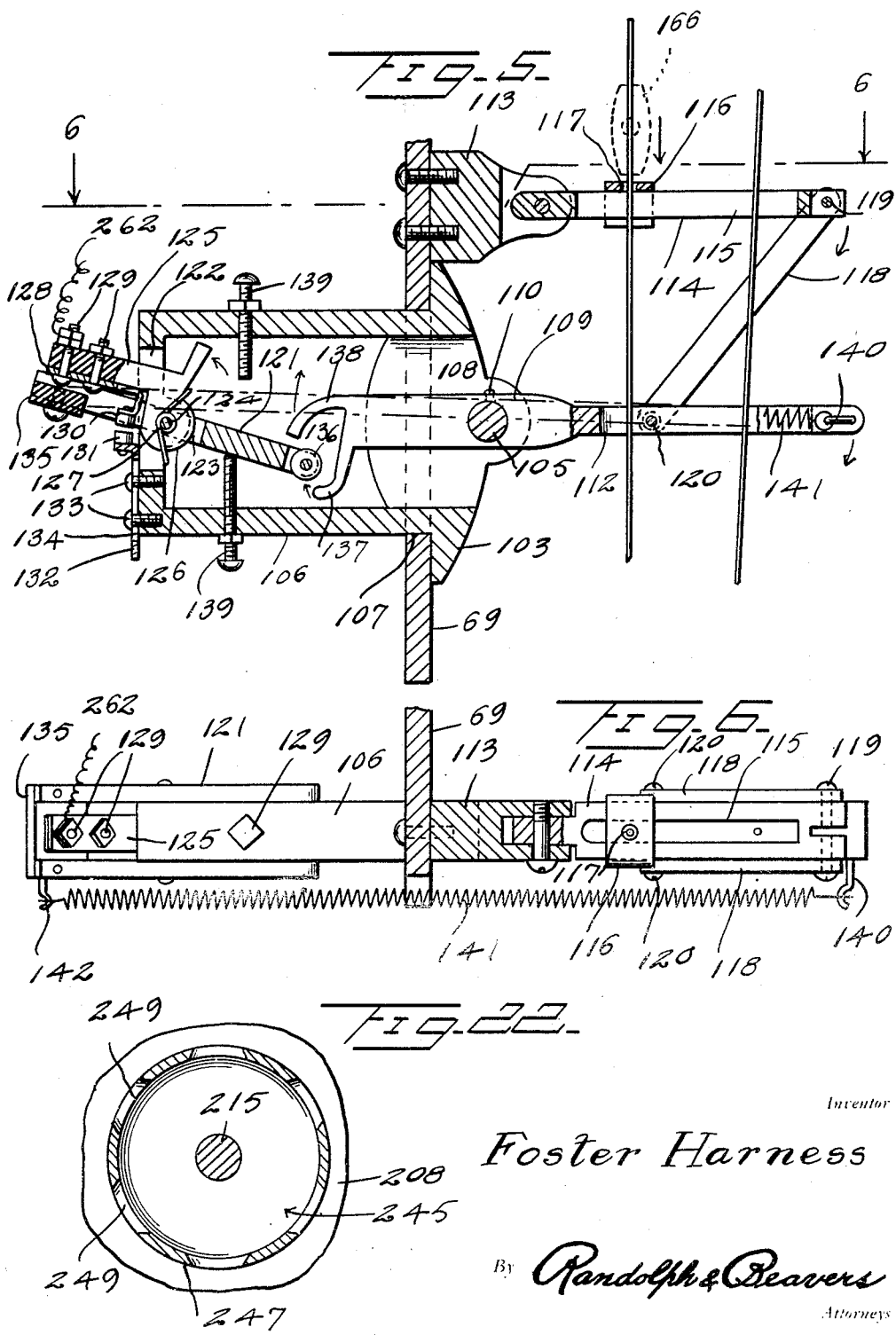

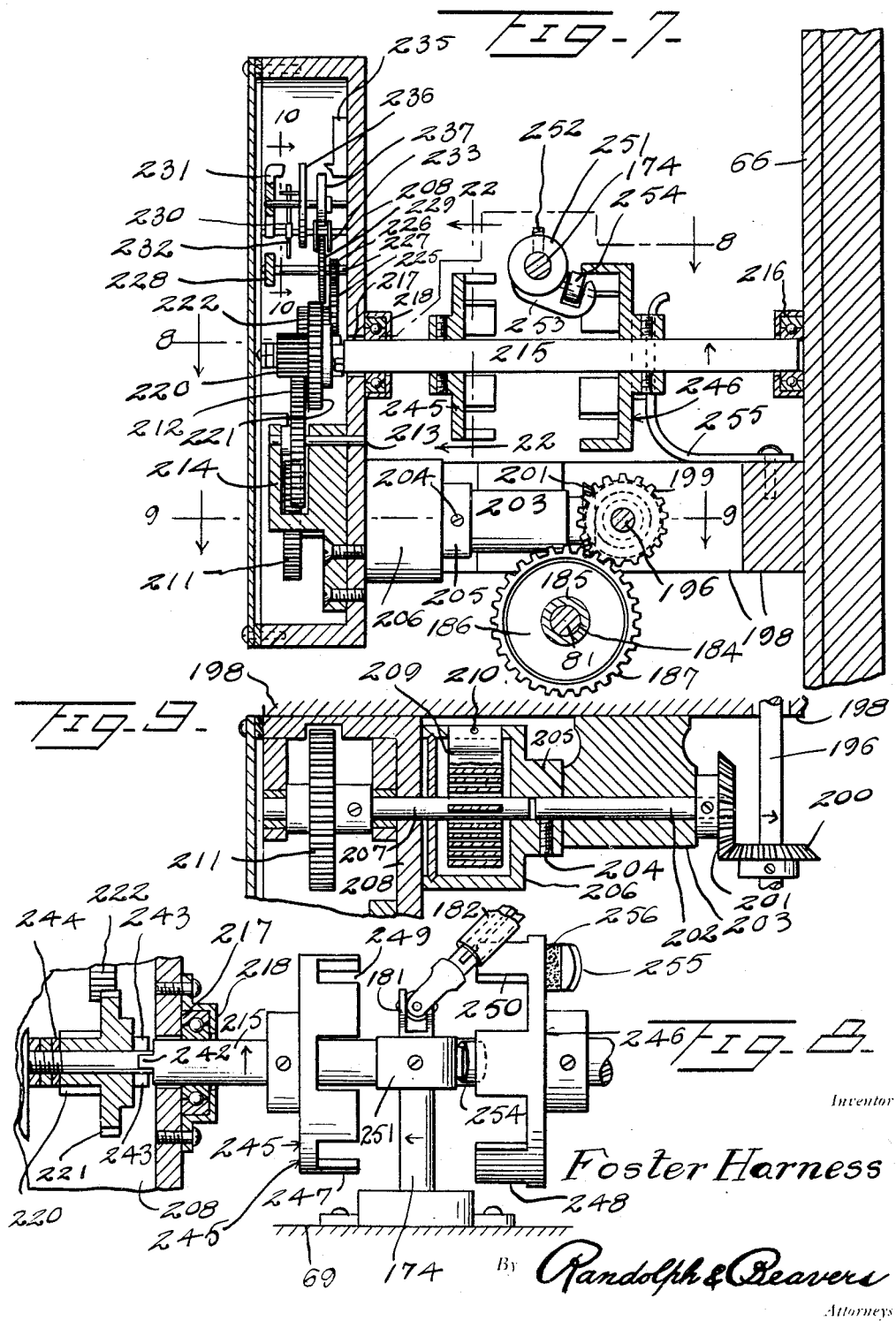

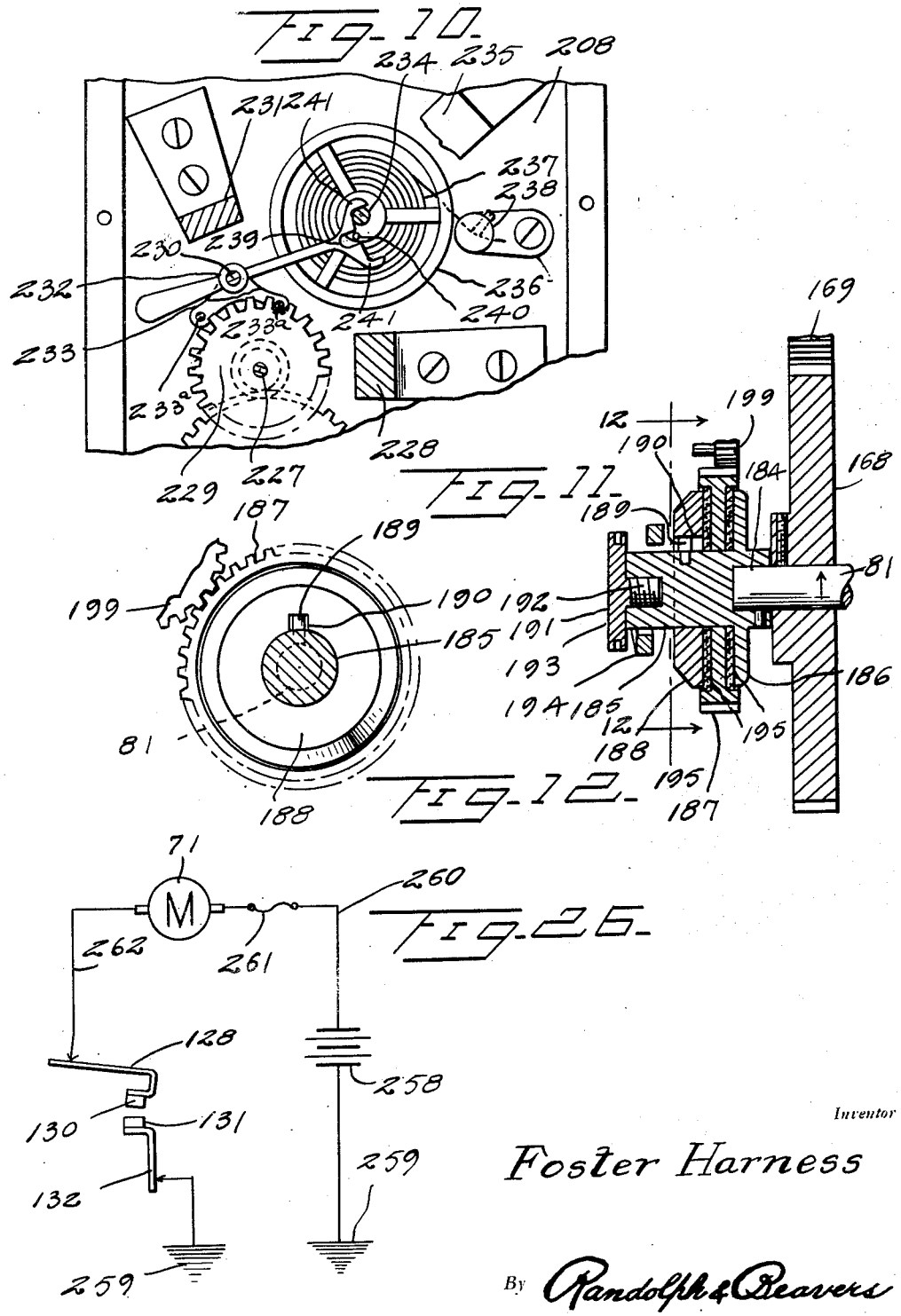

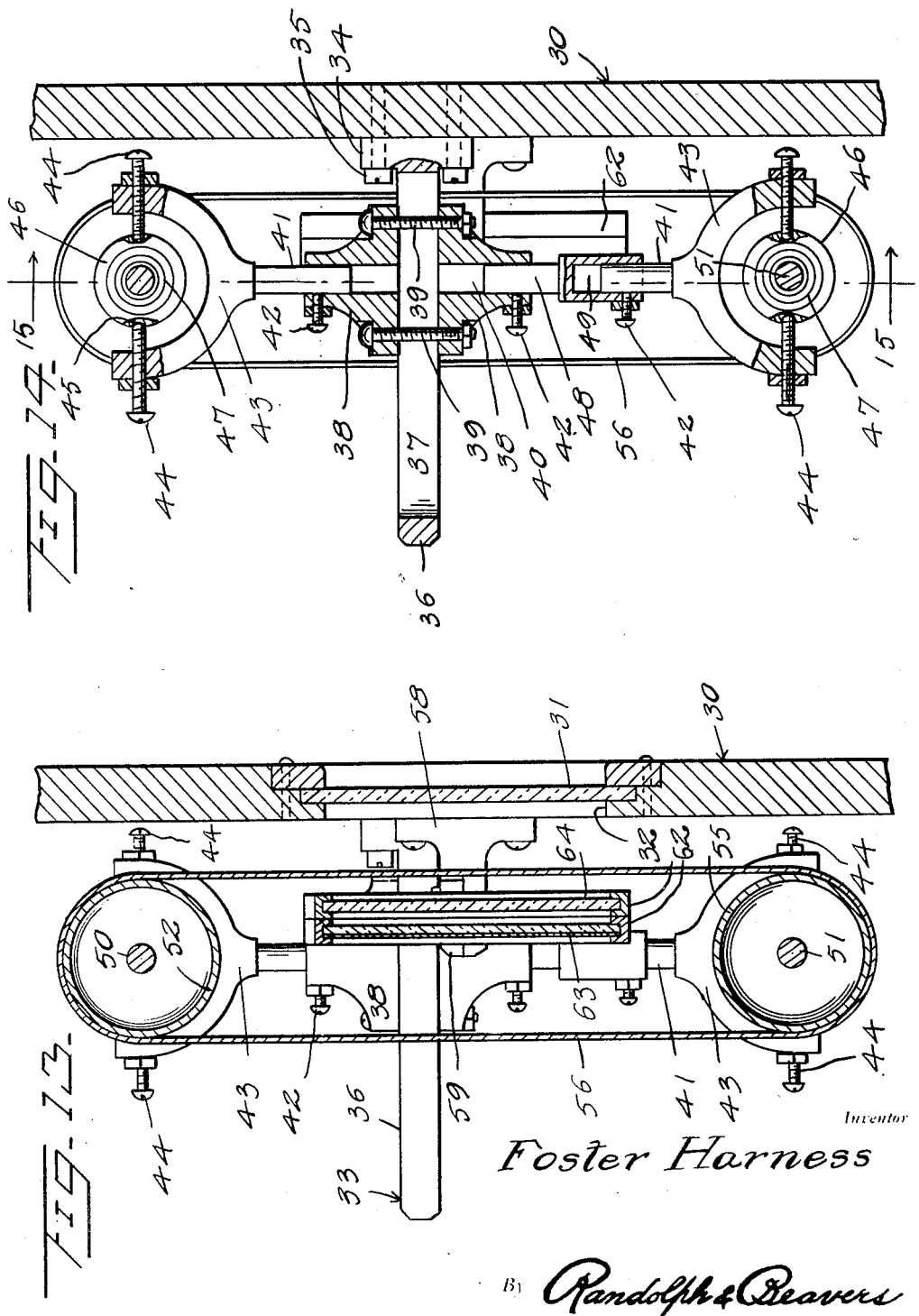

Oct. 24, 1950 F. HARNESS 2,526,817
CHANGEABLE EXHIBITOR
Filed Feb. 5, 1947 10 Sheets-Sheet 9
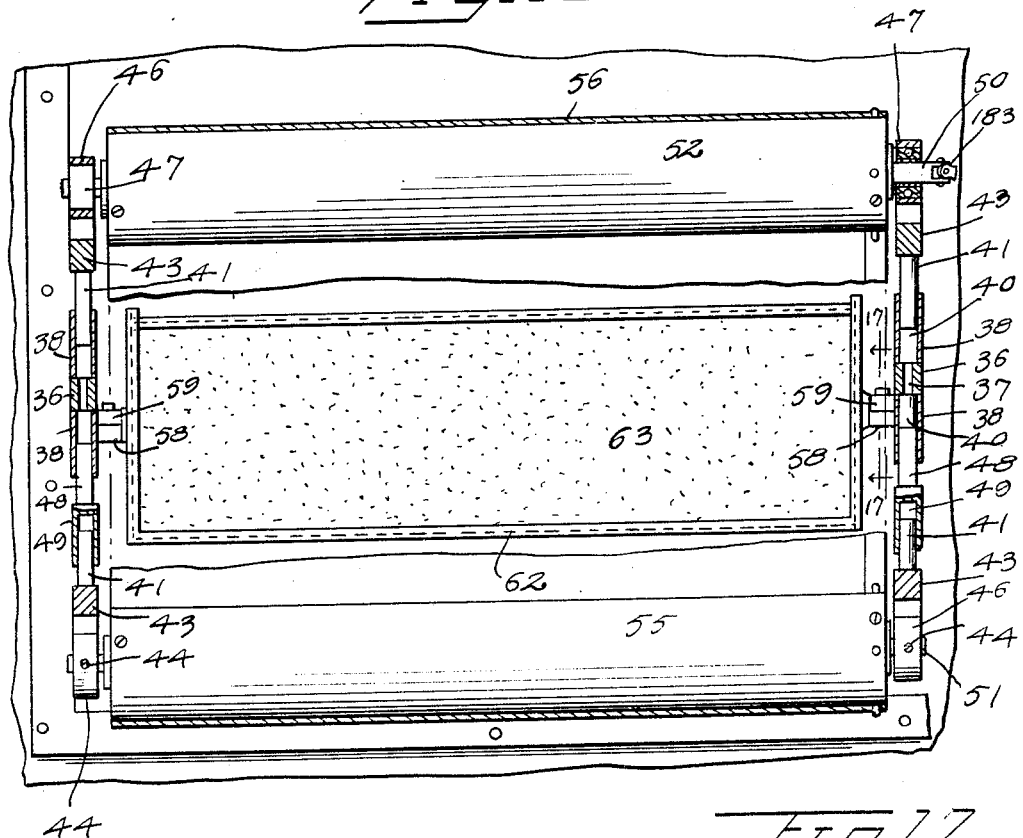
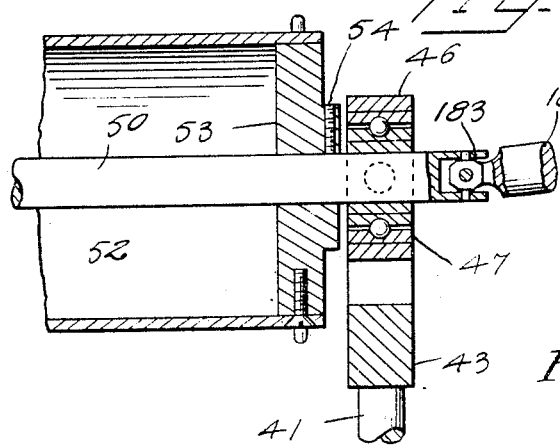
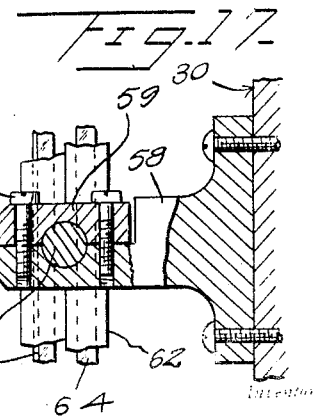
Foster Harness
By Randolph & Beavers
Attorneys Oct. 24, 1950     F. HARNESS     2,526,817
CHANGEABLE EXHIBITOR
Filed Feb. 5, 1947     10 Sheets—Sheet 10
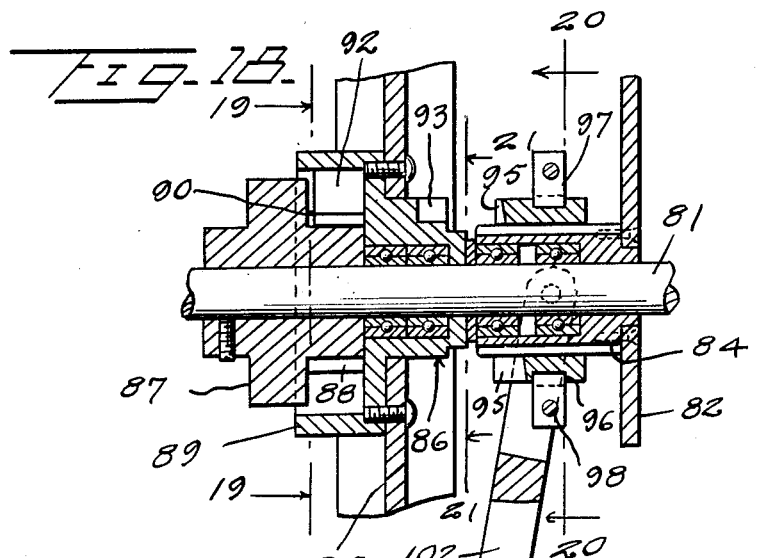
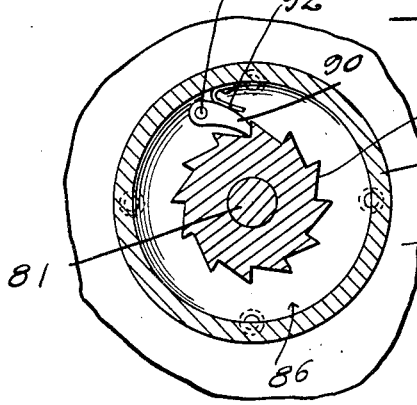
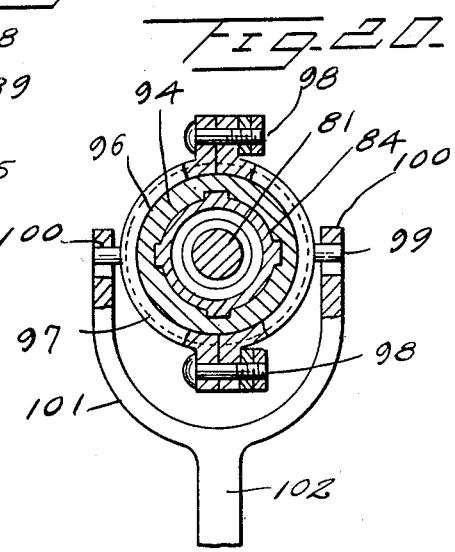
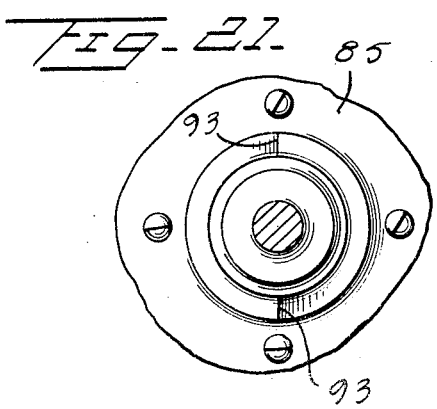
Inventor
Foster Harness
By Randolph & Beavers
Attorneys Patented Oct. 24, 1950

2,526,817

UNITED STATES PATENT OFFICE 2,526,817

CHANGEABLE EXHIBITOR

Foster Harness, Oklahoma City, Okla.

Application February 5, 1947, Serial No. 726,657

15 Claims. (Cl. 40—32)

This invention relates to a changeable exhibitor or sign especially intended and adapted to be used as an advertising medium and primarily designed for use in outdoor advertising in connection with billboards or similar signs intended to be read by motorists while travelling the highways, but which is likewise capable and adapted to be used in connection with other types of exhibitors or signs intended for advertising or other purposes.

A primary object of the present invention is to provide a changeable exhibitor or sign having a novel actuating means constructed and arranged to intermittently move various messages or other indicia into and out of a visible position and by means of which the exposed message or indicia may be maintained in a visible position for a sufficient length of time to enable it to be read or otherwise understood.

Still a further object of the invention is to provide a mechanism for actuating a changeable exhibitor intermittently and which is so constructed that the mechanism may be operated by a self contained source of power which is actuated only at intervals for loading other actuating means which will maintain the mechanism in operation until replenishment of power is required.

Still a further object of the invention is to provide a mechanism for actuating a changeable exhibitor intermittently and including escapement means for regulating and controlling the movement of the changeable exhibitor through additional means operable in response to the movement of the escapement means to a releasing position.

Still a further object of the invention is to provide a mechanism having a control arrangement for actuating and deactuating a prime mover of the mechanism at intervals and in response to an additional unit of the mechanism, the power for the operation of which is provided by said prime mover when rendered operable.

Still a further object of the invention is to provide a changeable exhibitor capable of use with indicia of various sizes and located at various angles with respect to the horizontal or vertical through minor adjustments of the parts, thus adapting the changeable exhibitor and its actuating mechanism to exhibitor frames or supporting structures of various sizes and shapes.

Still another object of the invention is to provide an actuating mechanism for a changeable exhibitor having a plurality of separate driven units, the operation of each of which is effected by and effects the operation of the other and each of which units is operated by a common source of power and including clutch means releasable in response to an overloading of one of the sub-mechanisms for maintaining a proper relationship between the mechanisms.

Various other objects and advantages of the invention will hereinafter become more fully apparent from the following description of the drawings, illustrating a preferred embodiment thereof, and wherein:

Figure 1 is a front elevational view looking toward the face of a sign or billboard equipped with the changeable exhibitor;

Figure 2 is an enlarged rear elevational view thereof showing the mechanism in applied and operative position;

Figure 3 is an enlarged transverse vertical sectional view taken substantially along a plane as indicated by the line 3—3 of Figure 2;

Figure 4 is a longitudinal vertical sectional view of a portion of the actuating mechanism taken substantially along a plane as indicated by the line 4—4 of Figure 3;

Figure 5 is an enlarged vertical sectional view taken substantially along a plane as indicated by the line 5—5 of Figure 3;

Figure 6 is a horizontal sectional view taken substantially along a plane as indicated by the line 6—6 of Figure 5;

Figure 7 is a transverse vertical sectional view taken substantially along a plane as indicated by the line 7—7 of Figure 4;

Figures 8 and 9 are horizontal sectional views taken substantially along planes as indicated by the lines 8—8 and 9—9, respectively, of Figure 7;

Figure 10 is an enlarged fragmentary vertical sectional view taken substantially along a plane as indicated by the line 10—10 of Figure 7;

Figure 11 is a sectional view through a portion of the mechanism and taken substantially at a right angle to Figure 7;

Figure 12 is a transverse sectional view taken substantially along a plane as indicated by the line 12—12 of Figure 11;

Figures 13 and 14 are transverse vertical sectional views taken substantially along planes as indicated by the lines 13—13 and 14—14 of Figure 2 and on enlarged scales;

Figure 15 is a longitudinal vertical sectional view, on a reduced scale, taken substantially along a plane as indicated by the line 15—15 of Figure 14;

Figure 16 is an enlarged sectional view of one end of the driving drum and the driving connection thereof;

Figure 17 is an enlarged cross sectional view taken substantially along a plane as indicated by the line 17—17 of Figure 15;

Figure 18 is an enlarged transverse sectional view of the weight actuated drum and clutch taken substantially along a plane as indicated by the line 18—18 of Figure 3;

Figures 19, 20 and 21 are cross sectional views of the drum and clutch parts taken substantially along planes as indicated by the lines 19—19, 20—20 and 21—21, respectively, of Figure 18;

Figure 22 is a transverse sectional view taken substantially along a plane as indicated by the line 22—22 of Figure 7;

Figure 23 is an enlarged longitudinal sectional view, partly in side elevation of the weight as shown in Figure 1;

Figure 24 is a longitudinal sectional view of the cushioning means for the anchored end of the cable or flexible support of the weighted element of Figure 23;

Figure 25 is a longitudinal sectional view, partly in side elevation and on an enlarged scale showing the adjustable stop for the cable or flexible supporting element of the weight;

Figure 26 is a diagrammatic view of the electric circuit of the motor employed for rewinding the cable or flexible element on the weight actuated drum, and Figure 27 is an enlarged horizontal sectional view taken substantially along a plane as indicated by the line 27—27 of Figure 4.

Referring more specifically to the drawings, the changeable exhibitor in its entirety includes a sign, billboard or other supporting surface or panel 30 which is ordinarily of the type adapted for use in outdoor advertising, but which may obviously assume various forms and may be utilized for indoor advertising. The panel or sign surface of the sign or billboard 30 is provided with a window 31 of any suitable transparent material which is detachably secured in an opening 32 of the billboard or sign 30, as best illustrated in Figure 13.

Referring particularly to Figures 2, 13, 14, 15, 16 and 17, a pair of guide members each designated generally 33 is secured to the rear side of the sign 30, one at each end of the opening 32. The guide members 33 include a headed end 34 secured by fastenings 35 against the rear side of the sign 30 and having an arm 36 extending perpendicularly therefrom and provided with a longitudinal slot 37, as seen in Figure 14, which opens upwardly and downwardly.

A pair of corresponding base members 38 is slidably supported by each guide arm 36, one above and one beneath, the individual base members 38 being connected detachably by fastenings 39 having portions extending through the slot 37 and which are adapted to be tightened for clamping the base members 38 to the arms 36 or which can be loosened for adjusting the base members longitudinally of the arm and toward or away from the rear side of the sign 30. Each of the base members 38 is provided with a longitudinal bore 40 disposed perpendicularly of its supporting arm 36 and which bores of the pairs of base members are disposed in alignment, as seen in Figure 14.

Each of the upper base members 38 is adapted to telescopically receive a standard 41 in the bore 40 thereof and which is adjustably secured therein by a set screw and lock nut 42. Each standard 41 is provided on its upper end and above its base member 38 with an upwardly extending yoke or fork 43 having opposed inwardly extending set screws and lock nuts 44 in each of the legs or furcations thereof and which are adapted to engage in opposed outwardly opening recesses 45 of a bearing ring or sleeve 46 containing a bearing 47, for a purpose hereinafter to be described.

Each of the lower base members 38 is adapted to receive a depending rod 48 which telescopes into the bore 40 thereof and which is adjustably retained therein by set screw and lock washer means 42, as previously described. Each rod 48 is provided on its lower end and beneath its base 38 with an outwardly or downwardly opening enlarged socket portion 49 adapted to receive a standard 41, corresponding to the standard 41 previously described and having a yoke 43 on the depending ends thereof and provided with set screw means 44 for mounting the bearing ring 46 containing a bearing 47 in the same manner as previously described. The socket 49 is provided with a set screw and lock nut 42 for adjustably securing the standard 41 thereof in adjusted position therein.

A shaft 50 is journaled adjacent its ends in the bearings 47 of the upper yokes 43 and a shaft 51 is similarly journaled in the lower bearings 47. A drum 52 is disposed around the shaft 50 between its bearings 47 and is provided with hubs 53 at the ends thereof secured to the shaft 50 by set screws or similar means 54, and a drum 55 may be similarly mounted on the shaft 51.

An endless curtain or strip 56 of any suitable flexible material is trained over the drums 52 and 55 and is of a width substantially corresponding to the length of the drums 52 and 55.

The endless curtain or strip 56 may be formed of any suitable material, either transparent or opaque, or partially transparent and partially opaque, and is preferably provided on the outer side thereof with suitable indicia 57 which extends transversely of the curtain 56 and which is disposed in equally spaced lines and which lines are so sized and spaced that one or a predetermined number thereof may be exposed at any given time through the window 31, as seen in Figure 1. The distance between the bottom edge or top edge of each line of indicia 57 and the complementary edge of the adjacent line of indicia on either side thereof is equal to one-half the circumference of the drum 52, for a purpose which will hereinafter become more apparent.

Accordingly, it will be readily apparent that if the drum 52 is rotated one-half revolution, the indicia 57 exposed through the window 31 will be changed so that the indicia previously exposed will be moved out of registry with the window and the indicia adjacent thereto will be moved into registry therewith.

As best seen in Figure 17, a pair of corresponding bearing members 58 are secured to and project from the rear side of the sign board 30 beyond the ends of the opening 32 and between and adjacent the guide members 33, so that said bearing members 58 project outwardly beyond the side edges of the front flight of the curtain 56. The bearing members 58 are provided at their outer, rear ends with detachable bearing sections 59 adjustably mounted by screw fastenings 60 and combining with integral portions of the arms or bearings 58 for receiving trunnions 61 which project from the ends of a frame 62 having multiple channels for receiving a mirror 63 and one or a plurality of lenses 64, disposed in front of the mirror 63. The frame 62 may be of any desired construction having a detachable side or end for detachably and replaceably mounting the mirror and lens or lenses and said frame, as illustrated in Figure 13, is disposed between the flights of the curtain or strip 56 substantially directly behind the window pane 31 so as to be disposed behind the line of indicia 57 which is disposed through the window 31. The trunnions 61 enable the frame 62 to be adjusted to various angles with respect to the flights of the curtain 56 for receiving light rays from the headlights of an approaching vehicle shining on the face of the sign board 30.

The mirror or reflector 63 and the lens or lenses 64 may be omitted if desired and when utilized, part or all of some or all of the lines of indicia 57 are provided with openings 65, as seen in Figure 2, through which the light rays may pass and be reflected from the mirror 63 back through the lens or lenses 64 and back through said openings 65. The lens or lenses 64 may be of various colors or shades so that the light rays reflected back through the openings 65 will be colored to cause the indicia, with which said openings 65 are associated, to stand out more predominately or to otherwise attract attention.

It is to be understood that the indicia 57 may assume other forms than the words as indicated in Figure 2, such as figures or pictorial representations for conveying an advertising message or the like.

It will be noted that the window 31 is disposed adjacent one end of the sign board 30 and a supporting plate 66, as seen in Figure 2, is detachably secured by fastenings 67 through the rear surface of the sign 30 and adjacent the opposite end thereof. The supporting plate 66 is provided with rearwardly extending vertically disposed walls or flanges 68 and 69 forming supporting means for an actuating mechanism, designated generally 70, and which functions to intermittently operate the curtain or strip 56 for moving the different lines of indicia 57 thereof into and out of registry with the window 31, as will hereinafter be described.

The actuating mechanism 70 is adapted to be powered by an electric motor 71 which is mounted on the base 66 between the upper portions of the walls or flanges 68 and 69 and which is provided with a driven shaft 72 having a pinion 73 fixed thereto.

The base or surface 66 is provided with two flanges 74 and 75 extending outwardly therefrom and which are disposed between and substantially parallel to the walls or flanges 68 and 69 and which are spaced from said flanges 68 and 69 and from one another, as best seen in Figure 4. A shaft 76 is journaled in bearings carried by the flanges 68 and 74 and has a relatively large gear 77 and a pinion 78 keyed thereto and disposed between said flanges. The gear 77 meshes with the pinion 73 and the pinion 78 meshes with the gear 79 keyed to a shaft 80 which is likewise journaled in bearings mounted on the walls or flanges 68 and 74 and beneath the shaft 76.

As best seen in Figure 4, a shaft 81 is journaled in bearings carried by the walls 68 and 69 and is disposed beneath the walls or flanges 74 and 75 and has a gear 82 turnably disposed thereon and in mesh with a pinion 83 keyed to the shaft 80. As best seen in Figure 18, a splined hub 84 is fixedly secured to and projects from one side of the gear 82 and is likewise rotatably mounted on the shaft 81 and extends in a direction toward the wall 69. The relatively large drum or pulley 85 is provided with a hub, designated generally 86, which is rotatably disposed on the shaft 81 between the splined hub 84 and the wall 69 for rotatably mounting said drum or pulley 85 relatively to the shaft 81. A collar 87 is keyed to the shaft 81 between the hub 86 and the wall 69 and is provided with a toothed portion at one end thereof forming a ratchet wheel 88 which is disposed within and spaced from an annular flange 89 of the hub 86. As best seen in Figure 19, a dog or pawl 90 is pivotally mounted on a pivot pin 91, supported by the hub 86, within the annular flange 89 and is biased by a leaf spring 92, anchored to the annular flange 89, into engagement with the teeth of the ratchet wheel 88. The teeth of the ratchet wheel 88 are inclined in a direction to permit the collar 87 and shaft 81 to revolve clockwise relatively to the drum 85 or, to permit the drum 85 to revolve counter-clockwise, as seen in Figure 19, relatively to the shaft 81, but for causing said drum or pulley 85 to be rotated with the shaft 81 when the latter is rotated in a counter-clockwise direction, as seen in Figure 19, all for a purpose hereinafter to be described.

The opposite end of the hub 86, which projects from the pulley or drum 85 toward the gear 82, is provided with substantially diametrically opposed shoulders 93 facing in a counter-clockwise direction, as seen in Figure 21. A second collar 94, as best seen in Figures 18 and 20, is splined to the gear hub 84 for sliding movement thereon toward and away from the last mentioned end of the drum hub 86, and is provided, at the end thereof adjacent to the hub 86, with outwardly projecting lugs 95 which are likewise diametrically opposed and adapted for interlocking engagement with the shoulders 93 when the clutch collar 94 is revolved in a clockwise direction, as seen in Figure 20. The collar 94 is provided with an annular outwardly opening groove 96 to receive a split ring 97 formed of detachable sections connected by nut and bolt fastenings 98 and each of which is provided with an outwardly projecting trunnion 99, intermediate of its ends, which trunnions are disposed in diametrically opposed relationship. The split ring 97 is rotatably disposed on the collar 94 and the trunnions 99 thereof turnably engage openings 100 in the legs of a yoke 101 which is formed on the upper end of a lever 102. The openings 100 are of a length to permit a limited relative sliding movement of the trunnions 99 with respect to the yoke 101.

As best illustrated in Figures 2 and 3, the wall or flange 69 is provided on its inner side and adjacent its lower end with spaced bearing members 103 and 104 in which a shaft 105 is journaled in a position substantially perpendicular to the base or surface 66. As seen in Figure 5, the bearing 103 forms a restricted open end of a housing 106 which is disposed in an opening 107 of the wall 69 so that a substantial portion of said housing extends from the outer side of the wall 69 and the bearing portion 103 thereof and which is disposed on the inner side of the wall 69 is provided with a restricted vertically disposed slot 108 forming the open inner end of the housing 106 and through which a lever 109 extends. The lever 109 is pivoted on the shaft 105, being adjustably keyed thereto by a set screw 110 so that one end of said lever is pivotally mounted within the housing 106 and the other end thereof extends outwardly therefrom and in a direction toward an offset continuation 111 of the wall 68. Said last mentioned end of the lever 109 is provided with an elongated longitudinally disposed slot 112 which opens upwardly and downwardly, for a purpose hereinafter to be described.

A bifurcated bracket 113 is secured to the inner, right hand side of the wall 69, above the bearing 103, as best seen in Figures 5 and 6 and has the restricted end of a lever 114 pivotally mounted in the outer, bifurcated portion thereof and extending toward the wall 68 disposed substantially parallel to and above the last mentioned sloted end of the lever 109. The lever 114 is likewise provided with a longitudinally disposed upwardly and downwardly opening slot 115 which is disposed substantially in vertical alignment with the slot 112 and said slotted portion of the lever 114 carries a guide 116 which is mounted for sliding movement lengthwise of the lever 114 and which is provided with an opening 117 registering with a portion of the slot 115.

A pair of links 118 are pivotally mounted by a fastening 119 at corresponding ends thereof to the opposite sides and outer end of the lever 114 and the opposite, lower ends of said links 118 are pivotally connected by fastenings 120 to the lever 109, substantially intermediate of its outer end and its pivot or the shaft 105, so that said links 118 extend inwardly and downwardly, or downwardly and toward the wall 69.

A lever arm 121 is provided with a slotted end 123 which fits around the outer end wall of the housing or frame 106, which end wall is provided with a slotted outer portion 123 through which extends a transversely disposed pivot pin 124 which is anchored in said end wall at its ends.

An arm 125 of electrical insulating material has an end extending inwardly through the opening 122 and is provided with a downwardly projecting apertured portion 126 which is disposed loosely in the slot 123 and pivotally on the pivot pin 124. A spring 127 is wound on the pivot pin 124 and has one end thereof extending downwardly and turned laterally to bear against the inner side of the outer end wall of the housing 106, and the opposite end thereof extending upwardly and engaging around a portion of the inner end of the insulating member 125 for urging said member 125 to swing in a counter-clockwise direction, as seen in Figure 5, or so that the outer end thereof will swing downwardly. An electrical conductor strip 128 is secured by fastenings 129 to the underside of the outer portion of the insulating arm 125 and is provided at its inner end with a downwardly offset portion which carries an electrical contact point 130 which is disposed above a similar contact point 131, which latter point 131 is supported on the upper end of an electrical conductor strip 132 which is adjustably supported on the outer end of the housing 106 by screws or similar fastenings 133 which extend through a longitudinal slot 134 thereof and by means of which the contact point 131 may be adjusted toward or away from the contact point 130.

The outer slotted or bifurcated end of the lever arm 121 is provided with a cross bar 135 of electrical insulating material adapted to bear against one of the fastenings 129 for rocking the insulating arm 125 in a clockwise direction and for normally retaining its contact point 130 out of engagement with the contact point 131.

The inner end of the lever arm 121 is slotted or bifurcated to carry a small cam roller 136. The opposite end of the lever 109, which is disposed in the housing 106, is bifurcated to receive the end of the lever arm 121 provided with the roller 136, and said bifurcated portion includes a downwardly and outwardly turned finger 137 which is disposed beneath the roller 136 and an upper outwardly and downwardly curved finger 138 which is disposed over the roller 136. The housing 106 is provided in the top and bottom thereof with an adjustable set screw 139, each of which carries a lock nut, which set screws extend inwardly above and beneath the inner end of the lever arm 121 for limiting the swinging movement thereof and the lowermost of which is normally disposed to support the lever arm 121 in a normal position inclined upwardly and outwardly and so that the roller 136 is disposed between and spaced from the free ends of the fingers 137 and 138 and so that the cross bar 135 is positioned to hold the insulator arm 125 and its contact point 130 in an elevated position so that the contact point 130 is out of engagement with the contact point 131.

As best seen in Figures 5 and 6, the first mentioned, exposed end of the lever 109 is provided with a laterally projecting hook 140 to which is anchored one end of a contractile coil spring 141 which extends across a portion of the outer edge of the wall 69 and which is anchored at its opposite end to a similar hook 142 which projects laterally from the corresponding side edge of the outer end of the lever arm 121. The spring 141 forms a toggle or over-center spring which is normally disposed above the center of the pivot 124 for yieldably retaining the lever arm 121 in its normal position of Figure 5 inclined outwardly and upwardly.

As best seen in Figures 3 and 4, a crank arm 143 is adjustably keyed to the shaft 105 by a set screw 144, substantially intermediate of the bearings 103 and 104 and normally extends upwardly therefrom. A lever arm 145 is provided with an upwardly offset bifurcated end which is pivotally connected to the upper, free end of the crank arm 143, said lever arm 145 extending therefrom in a direction away from the wall 69 and having a downwardly offset opposite end provided with a longitudinal slot 146, opening laterally on both sides thereof, and which is pivotally connected by a pin 147 to the opposite, lower end of the lever 102. A set screw 148 extends adjustably into the outer end of the slot 146 to limit the sliding movement of the pivot 147 relatively to said slot. As seen in Figure 4, a bracket arm 149 extends inwardly from the wall 68 and is provided with a bifurcated free end portion to receive the intermediate portion of the lever 102 and which portion is pivotally connected to the bracket arm 149 by a pivot pin 150 extending therethrough. A spring 151 is wound on the pivot pin 150 and has one end thereof bearing against the underside of the bracket arm 149 and the opposite end thereof bearing against one edge of the lever 102, beneath the pivot 150, for urging said lever to rock in a clockwise direction, as seen in Figure 4, for yieldably retaining the clutch collar 94 normally out of engagement with the hub 86.

As best seen in Figure 2, a cylinder or tube 152 is secured to the inner side of the wall or flange 68 and is spaced outwardly relatively to the shaft 81 and gear 82 and is disposed longitudinally of said wall or flange 68. As seen in Figure 24, the tube or cylinder 152 is provided with a restricted opening 153 in the lower end thereof forming a seat for an expansion coil spring 154, contained therein, and which bears against the lower end of a piston 155 for urging said piston upwardly and toward a removable closure 156 in the upper end of the tube or cylinder 152. The piston 155 carries a sealing member 157 on its upper end and the tube or cylinder 152 is provided with a vent port 158 which communicates with the interior thereof adjacent the plug or closure 156.

An elongated flexible member or cable 159 is fastened at one end thereof to the piston 155 and extends downwardly through the spring 154 and outwardly through the opening 153 and, as seen in Figures 1, 2 and 23, the flexible member or cable 159 extends downwardly and is trained under a pulley 160 which is journaled in a recessed upper portion 161 of a weight housing 162 which removably contains a weighted block 163 of lead or the like and which combines therewith to form the weight, designated generally 164. The cable portion which extends downwardly from the cylinder or tube 152 to the pulley 160 extends through the slots 115 and 112 of the levers 114 and 109, respectively, and said cable 159 after passing under the pulley or sheave 160 extends upwardly through the slot 112, through the slot 115 and the opening 117 of the guide 116, and is wound on the periphery of the drum or pulley 85 with the opposite end anchored thereto as seen at 165 in Figure 3. Said last mentioned end portion of the cable 159 is wound on the drum 85 in a clockwise direction looking from right to left of Figure 4. As seen in Figures 3 and 25, an adjustable stop 166 is adjustably mounted on the cable 159 above the slide 116, said stop 166 having a bore through which the cable slidably extends and being provided with set screws 167 for adjustably anchoring the stop to the cable, as clearly illustrated in Figure 25.

As best seen in Figure 4, the shaft 81 extends outwardly through and substantially beyond the wall or flange 69 and is provided with a gear 168 which is keyed thereto and disposed on the outer or left hand side of the wall 69 and which meshes with a pinion 169 which is disposed thereabove and keyed to a shaft 170 which extends through openings of the walls 69 and 75 and which is journaled in bearings mounted thereon and in a bearing 171 which projects outwardly from the base surface 66. A gear 172 is keyed to the shaft 170, between the walls 69 and 75 and meshes with a pinion 173 disposed thereabove and keyed to a shaft 174 which likewise extends through openings of the walls 69 and 75 and which is journaled in bearings supported thereby. The right hand end of the shaft 174 has a beveled gear 175 keyed thereto and disposed between the walls 74 and 75 and which meshes with a beveled gear 176 keyed to one end of a shaft 177 which is journaled in a sleeve bearing 178 which extends perpendicularly from the base surface 66, as best seen in Figure 3. The opposite end of the shaft 177 extends loosely through aligned openings 179 in the panel 30 and surface 66 and said opposite end of the shaft 177 is disposed on the forward side of the panel or sign board 30 and may have an arrow 180 or other suitable indicator either fixably connected thereto or otherwise connected to be actuated by the rotation of the shaft 177 for calling attention or otherwise attracting the eye to the message exposed through the window 31.

Referring to Figure 4, the shaft 174 at its opposite or left hand end and to the left of the wall 69, is connected by a universal joint 181 to one end of a splined telescoping shaft 182 which is connected at its opposite end by a universal joint 183 to the adjacent or inner end of the drum shaft 50.

As best seen in Figures 4, 11 and 12, the left hand end of the shaft 81, to the left of the gear 168, is keyed in an outwardly opening socket 184 in one end of a hub 185, which hub is provided with an annular flange 186 adjacent said aforementioned end. A gear 187 is rotatably mounted on the hub 185 between the flange 186 and a collar 188 which is slidably keyed to the hub 185 by a pin 189, projecting therefrom and engaging a slot or groove 190 in said collar 188. The opposite, left hand end of the hub 185 is provided with a detachable and adjustable head or disk 191 having a threaded stem 192 projecting from one side thereof and engaging a threaded bore 193 in the opposite end of said hub. A spring 194 is disposed on the hub 185 between the head 191 and the adjacent side of the collar 188 for urging said collar toward the gear 187 and flange 186. The adjacent faces of the flange 186 and collar 188 are provided with gripping surfaces 195 adapted for clamping engagement with the web of the gear 187 to thereby key said gear to the hub 185 for rotation therewith and with the shaft 81. It will be readily apparent that the disk or head 191 may be adjusted relatively to the left hand end of the hub 185 for adjusting the tension on the spring 194 thereby to vary the amount of pressure required to cause the gear 187 to slip relatively to the friction faces 195. The outer end of the coil spring 194 will normally bite into the inner side of the disk or head 191 to retain it in any adjusted position with respect to the hub 185 so as to maintain the proper adjustment of the spring 194.

As seen in Figure 4, a shaft 196 is disposed above and inwardly of the vertical center of the gear 187 and is journaled at its right hand end in a bearing 197 which projects outwardly from the surface 66 and to the left of the gear 168, as seen in Figure 4, and is journaled at its opposite end in a bracket arm 198, as best seen in Figure 7, which likewise projects outwardly from the surface 66 and which is disposed to the left of the bearing 197. A pinion 199 is keyed to the shaft 196 and meshes with the gear 187 for driving a bevel gear 200 which is likewise keyed to said shaft 196 and which meshes with a bevel gear 201, keyed to one end of a shaft 202, as best seen in Figure 9, which is journaled in a bearing 203 which projects laterally from the bracket arm 198 in a direction toward the wall 69.

As best seen in Figure 9, the opposite end of the shaft 202 projects from the outer end of the bearing 203 and is detachably secured by a set screw 204 in a hub 205 forming one end of a housing 206 which is thereby detachably keyed to the shaft 202. A shaft 207 is journaled in the housing 206 and projects from the opposite end thereof through the inner or rear wall of a housing 208 for a timing mechanism. The housing 208 is likewise secured to the bracket arm 198 and projects laterally therefrom toward the wall 69 and outwardly of the bearing 203.

A coil spring 209 is wound within the housing 206 around the shaft 207 and has its inner end anchored to said shaft and is wound therearound in a clockwise direction, looking from right to left of Figure 9, the outer end of said spring being anchored at 210 to the housing circumference or peripheral wall. The convolutions of the spring 209 are wound so as to be disposed one around another, as clearly illustrated in Figure 9.

A gear 211 is keyed to the shaft 207 and disposed within the housing 208, said gear meshing with and driving a gear 212, as seen in Figures 2 and 7, which is likewise disposed in the housing 208 and keyed to a shaft 213 which is journaled in a bearing 214, supported within the housing 208.

A shaft 215 is journaled at its forward end in a bearing 216 which is mounted on the exposed, rear side of the wall or surface 66 and extends rearwardly therefrom through an opening 217 in the rear wall of the housing 208 and is journaled in a bearing 218 supported on the outer side thereof, said shaft 215 being disposed above the level of the bracket arm 198 and extending into the housing 208, substantially intermediate of its top and bottom ends. As best seen in Figure 8, the shaft 215, at the end thereof which extends into the housing 208, is provided with a restricted extension 219 which projects axially from said end and which carries a hub member which is rotatably mounted thereon and has a pinion 220 at its outer end which meshes with the gear 212 and a gear 221 at its opposite, inner end or adjacent the rear wall or inner wall of the housing 208 which gear 221 meshes with a pinion 222 keyed to a shaft 223 which is journaled in a bearing 224 within the housing 208 and which is disposed to the left of the shaft 215, as seen in Figure 2. A gear 225 likewise is keyed to the shaft 223, inwardly of the pinion 222 and meshes with a pinion 226 on a shaft 227, which is journaled in the housing 208 in a bearing 228, substantially above the shaft 223.

As best seen in Figure 10, an escapement gear 229 is keyed to the shaft 227, outwardly of the pinion 226. A shaft 230 is journaled in a bearing 231 within the housing 208 and above the escapement gear 229 and has an escapement lever 232 keyed thereto, outwardly of the escapement gear 229, as seen in Figure 7. An escapement pallet 233 is keyed to the shaft 230 inwardly of the escapement lever 232 and is provided adjacent its ends with laterally projecting pallet pins 233a for alternately engaging spaced teeth of the escapement gear 229 to permit such gear or wheel 229 to revolve intermittently in a step by step movement.

A balance wheel shaft 234 is journaled in the upper part of the housing 208 in a bearing 235 thereof and carries a balance wheel 236 keyed thereto and has a balance spring 237 wound therearound and anchored at its inner end to the shaft 234 and at its outer end to a clamp 238, contained and secured within the housing 208. One end of the escapement lever 232 is provided with an outwardly opening notch 239 disposed to be engaged by a pin 240 which projects transversely from the hub of the balance wheel 236, and said end of the escapement lever 232 is provided with laterally spaced inwardly facing corresponding hook portions 241 forming stops to engage the shaft 234 for limiting the rocking movement of said escapement lever.

Referring again to Figure 8, the end of the shaft 215 from which the stem 219 extends is provided with substantially oppositely disposed outwardly projecting lugs 242 which are disposed between similar lugs 243 which project from the adjacent end of the hub 244, which forms integral parts of the pinion 220 and gear 221. The lugs 243 and 242 are of a size so that a considerable relative movement may occur between the hub 244 and the shaft 215 before said lugs will be moved into engagement for causing the hub to rotate with the shaft, for a purpose hereinafter to be described.

The shaft 215, between the bearings 216 and 218, is provided with a pair of escapement collars or drums, designated generally 245 and 246, respectively, the hub portions of which are adjustably keyed to said shaft 215 as by means of set screws, as clearly illustrated in Figure 7. The collars or drums 245 and 246 are each provided with an inwardly projecting annular flange 247 and 248, respectively, having substantially equally spaced inwardly opening notches or cut-outs 249 and 250, respectively, which are spaced about the peripheries thereof in a circumferential direction. The flange or periphery 248 of the drum 246 is of substantially the same external diameter as the internal diameter of the flange 247 of the drum or collar 245.

As best seen in Figure 7, the shaft 174 extends transversely over the shaft 215 between the drums or collars 245 and 246 and has a collar 251 keyed thereto adjustably by a set screw 252 so as to be disposed substantially directly over the shaft 215. As seen in Figure 7, the collar 251 is provided with an integral arm or extension 253 which is recessed to receive a roller 254 which is journaled therein and which projects from a side edge thereof for engagement with either the inner side of the flange 248 or the outer side of the flange 247. As seen in Figure 22, the side edges of the cut-outs or notches 249 of the annular flange 247 are beveled on their inner sides so that the roller 254 in riding over the solid portion of the outer side of the flange 247, toward one of the notches or cut-outs 249, will upon clearing the outer edge thereof be free to drop through said notch 249. Similarly, the side edges of the flange 248 defining the sides of the notches 250 are beveled on the opposite sides so that the roller 254 when moving along the inner side of the flange 248 and upon clearing one of said edges, will be free to move outwardly unobstructedly through one of the notches or cut-outs 250.

Referring to Figure 7, a leaf spring 255 is fastened adjacent one end thereof to the upper side of the bracket arm 198, adjacent the surface 66 and extends rearwardly and upwardly on the outer side of the collar or drum 246, and as seen in Figure 8, is provided adjacent its free end and on its outer side with a brake shoe 256 which yieldably bears against the outer side of the drum or collar 246 to frictionally resist the rotation thereof and accordingly the rotation of the drum 245 and also the shaft 215, for a purpose which will hereinafter become apparent.

As seen in Figure 2, a horizontal wall or flange 257 projects laterally from the lower end of the wall 68 in a direction away from the wall 69 to provide a space thereabove and to the right of the wall 68, as seen in Figure 2, adapted to contain a storage battery or other self-contained source of electric current, not shown in Figure 2, but illustrated diagrammatically at 258 in Figure 26. The storage battery 258 is grounded at 259 to the supporting structure including the supporting surface or base 66 and the walls or flanges projecting therefrom, and is connected by a conductor 260 to one post of the electric motor 71, with a fuse 261 interposed between said post and the battery or electrical source 258. The fuse 261 is illustrated in Figure 2 mounted on the inner side of the wall 68. The other terminal or post of the motor 71 is connected by a conductor 262 to the movable contact point 130, said conductor 262 being fastened to one of the nut and bolt fastenings 129, as illustrated in Figures 5 and 6 for forming an electrical connection therethrough to the strip 128 and the contact point 130. The contact point 131 through its conductor strip 132 is grounded on the frame or ground 259, so that a circuit will be completed to the electric motor 71 from the battery 258 when the switch points or terminals 130 and 131 are in engagement or will be interrupted when said terminal points are out of engagement, as illustrated in Figure 26.

Assuming the parts of the actuating mechanism to be in the position as illustrated in Figures 2, 3 and 4, when so disposed, the over-center spring 141 will be disposed above the dead center or pivot 124 for holding the levers 109 and 114 in their positions of Figure 2, so that the circuit of Figure 26 will be broken due to the contact point 130 being held out of engagement with the contact point 131 to thus maintain the electric motor 71 de-energized. With the parts thus disposed, the gravitational pull exerted by the weight 164 will urge the drum or pulley 85 to revolve in a counter-clockwise direction, as seen in Figure 3, to unwind the cable 159 therefrom. When the drum or pulley 85 is thus revolved by the action of the weight 164, the pawl and ratchet means 88, 96, as seen in Figure 19, will cause the shaft 81 to be likewise revolved in a counter-clockwise direction, as seen in Figure 3 for rotating the pinion 169 from the gear 168 to revolve the shaft 170 in the opposite direction which will in turn drive the shaft 174 in the same direction as the shaft 81 through meshing engagement of the gear 172 with the pinion 173. Accordingly, if the roller 254 is disposed to pass through one of the notches 249 or 250, said shaft 174 may revolve one-half revolution in a counter-clockwise direction, looking from right to left of Figure 4 until the roller 254 engages the annular flange or periphery of the other drum or collar 245 or 246, this being accomplished due to the fact that the cut-outs or notches 249 and 250 are staggeredly arranged, as seen in Figure 8. This rotation of the shaft 174 will be imparted through the shaft 182 to the shaft 50 for rotating the drum 52 one-half a revolution for turning the curtain 56 so that the forward flight thereof will move a distance equal to the distance between the lines of indicia 57 for positioning another line of indicia 57 in a position to be visible through the window 31. It will be readily apparent that by adjusting the bases 38 on the guides 33, as previously described, a drum 52 of a different diameter may be mounted on the shaft 50 so that the size of the indicia may be varied and yet will be caused to function in the same manner.

As the shaft 81 is thus revolved in a counter-clockwise direction, as seen in Figure 3, the gear 187 will also be revolved in the same direction for turning the shaft 196 through the gear or pinion 199 in the opposite direction or clockwise, as seen in Figure 7. This will cause the shaft 202 to be driven through engagement of the pinions 200 and 201 in a clockwise direction, looking from right to left of Figure 9, for revolving the housing 206 in the same direction for winding the spring 209. The loaded spring 209 will cause the shaft 207 to revolve in the same direction as the shaft 202, but independently thereof and in response to loaded spring 209 for revolving the gear 211 in the same direction.

This will cause the gear train contained within the housing 206 to be driven from the gear 211 through the meshing of the gears and pinions, as previously described, the speed of movement of said gear train being regulated by the escapement wheel 229, escapement lever 232, balance wheel 236, hair spring 237 and pallet 233 whereby the speed of rotation of the gear train will be accurately regulated, similar to a clock mechanism.

As illustrated in Figure 8, and as previously described, the hub 244 and its pinion 220 and gear 221 being rotatably mounted on the stem 219 of the shaft 215 are thereby permitted to rotate relatively to said shaft 215 for turning the lugs 243 relatively to the lugs 242 until the former engage the latter thereby to cause the shaft 215 to revolve with the hub 244. The shaft 215 is driven by the hub 244 in a clockwise direction looking from right to left of Figure 8. Assuming the parts to be in positions as illustrated in Figure 8, the cam roller 254 is shown engaging the inner side of the annular flange portion 48 of the drum or collar 46 so that the shaft 174 is prevented from rotating in a counter-clockwise direction looking from bottom to top in Figure 8. As the shaft 215 is rotated in its clockwise direction, as previously described, one of the notches 250 will move toward a position to receive the cam roller 254 and its supporting arm 253 and when said cam roller moves over the adjacent edge of said notch it will cause the freely rotatable shaft 215 to be cammed in a clockwise direction at a greater speed than the hub 244 is revolving for thus moving the lugs 242 thereof out of engagement with the lugs 243 and so that the roller 254 and its arm 253 may pass through said notch 250 to permit the shaft 174 to turn in a counter-clockwise direction, as previously described. When this occurs, it will be readily apparent that a portion of the flange or periphery 247 of the drum 245 will be disposed to provide a stop for the cam roller 254 which will engage the outer side thereof to thus limit the counter-clockwise turning movement of the shaft 174 to an arc of substantially 180°.

As previously described, this will allow the curtain drum shaft 50 and curtain drum 52 to be revolved 180° in a counter-clockwise direction, as seen in Figures 13 and 14 for moving the front flight of the curtain 56 upwardly a distance so that one line of the indicia 57 will be moved out of registry with the window 31 and the line of indicia, therebeneath, will be moved into an exposed position with respect thereto.

As the hub 244 continues to rotate through the power derived from the loaded spring 209, the lugs 243 thereof will again move into engagement with the lugs 242 to repeat the previously described operation so that the cam roller 254 will ride over the exterior of a portion of the flange 247 and thereafter pass through one of the notches 249 and, in so doing will again kick the shaft 215 in a clockwise direction, looking from right to left of Figure 8, and will return to its position of Figure 8 in engagement with the inner side of the flange 248, thus allowing the shaft 174 to again rotate through an arc of 180° for again moving the curtain 56, in the same manner as previously described. Obviously, the speed of operation of the gear train contained within the housing 208 can be regulated for regulating the length of time between movements of the drum 52 and curtain 56 so as to regulate the length of time that each line of indicia 57 will remain in an exposed position behind the window 31. The spring 255 and its shoe 256 normally retain the collars 245 and 246 and shaft 215 in the position to which they are moved either by engagement of the lugs 243 with the lugs 242 or to the position to which they are moved by the impulse imparted thereto by the cam roller 254.

From the foregoing it will be readily apparent that the gear train contained within the housing 208 will operate continuously whereas the pulley or drum 85 will rotate in response to the impulse or force exerted thereon by the weight 164 only when the cam roller 254 is released by one of the drums or collars 245 or 246 so that said pulley 85, the gears and pinions 168, 169, 172, and 173 will only rotate intermittently and likewise the gear 187 will be turned intermittently to drive the pinion 199 and bevel gears 200 and 201. Accordingly, the spring 209 will be wound intermittently but sufficiently for loading said spring while the mechanism is in operation. When the spring 209 is loaded to a predetermined extent, the clutch spring 194 will permit the gear 187 to slip between the friction faces 195 of the flange 186 and disk 188 to prevent overloading the spring 209. As previously stated, the head 191 can be adjusted to regulate the extent of loading of the spring 209 before the spring 194 will permit slippage of gear 187.

Likewise, when the shaft 174 is intermittently driven in a counter-clockwise direction, looking from right to left of Figure 4, the shaft 177 through the meshing engagement of the pinions 175 and 176 will be driven in a clockwise direction, as seen in Figure 4, for actuating the arrow or pointer 180, and said pointer 180 will also be revolved one-half a revolution in a counter-clockwise direction, as seen in Figure 1, each time the shafts 174 and 177 are actuated, so that it will be readily apparent that numerous movements other than a rotational movement of the pointer or arrow 180 may be readily accomplished as by means of a cam connection or both ends of said arrow may be pointed or the pointer 180 may be shaped to simulate a pointed finger of a hand at each end thereof.

As the drum or pulley 85 is permitted to revolve intermittently in a counter-clockwise direction, looking from right to left of Figure 4, or as seen in Figure 3, the cable 159 will be unwound therefrom so that the stop 166 will move downwardly toward the guide member 116, the opening 117 of which is too small to permit the passage of the stop 166 therethrough. When the stop 166 strikes the slide 116, the lever 114 will be swung downwardly thereby to rock the right hand end of the lever 109 downwardly through the connection of the links 118, as seen in Figure 5. When this occurs and when the toggle or over-center spring 141 moves past the dead center of the pivot 124, as a result of the finger 137 of the lever 109 engaging the roller 136 for swinging the inner end of the lever arm 121 upwardly, said toggle spring 141 will cause the lever arm 121 to be rocked in a counter-clockwise direction, as seen in Figure 5, until it is stopped by engagement with the upper set screw 139. This will move the outer end of the lever arm 121 out of obstructing relationship to the insulating arm 125 to permit the spring 127 thereof to rock the outer end of said insulating arm 125 downwardly or in a counter-clockwise direction to cause the contact point 130 to engage the contact 131. This will energize the electric motor 71 through the circuit as illustrated in Figure 26, and as previously described, for driving the motor shaft 72 to drive its pinion 73 which will drive the gears and pinions 77, 78, 79, 83, and 82 for rotating the shaft 81 clockwise as seen in Figure 3. At the same time that the lever 109 is rocked clockwise, as seen in Figure 5, the shaft 105 to which it is keyed will also be rocked in the same direction for causing the crankarm 143 to be rocked clockwise, as seen in Figure 4, to cause its lever arm 145 to rock the lever 102 in a counter-clockwise direction for moving the clutch collar 94 to the left of Figure 4 so that the lugs 95 thereof will interengage with the shoulders 93 of the hub 86 for turning the pulley or drum 85 also in a clockwise direction with the shaft 81 to rewind the cable 159 thereon.

This will cause the weight 164 to be moved upwardly until it strikes the lever 109 for rocking it in a counter-clockwise direction, as seen in Figure 2, to thereby cause the lever 114 to return to its position of Figure 2 through connection of the links 118 and to cause the toggle spring 141 to pass upwardly across the dead center of the pivot 124, due to the fact that the upper finger 138 bears downwardly on the roller 136 to rock the lever arm 121 clockwise, as seen in Figure 5. When the toggle spring 141 passes its dead center position, it will then snap the parts back to their positions of Figures 2 and 5 so that the drum 85 may then again be intermittently actuated in a counter-clockwise direction, as seen in Figure 3, in response to the gravitational pull exerted by the weight 164 for operating the mechanism, as previously described. It will also be readily apparent that when the lever arm 121 is moved clockwise, as seen in Figure 5, that the insulating arm 125 will be rocked in the same direction for breaking the connection between the contacts 130 and 131 to de-energize the motor 71 and the clutch collar 94 will be moved to the right of Figure 4 by the action of the spring 151, due to the fact that the parts 143 and 145 are returned to their positions of Figure 4. In the initial movement of the parts 143 and 145 back to their positions of Figure 4, the pin 147 will slide in the slot 146 until engaged by the set screw 148 which will exert an initial kick thereagainst in a clockwise direction so that with the action of the spring 151, the clutch collar 94 will be positively moved to the right and to a disengaged position, as illustrated in Figure 4.

In order to prevent damage to the parts as the weight 164 strikes the lever 109 and until the motor 71 can be de-energized and the clutch 94 disengaged, the cushioning means as illustrated in Figure 24 is provided and by which the anchored end of the cable 159 may slide downwardly and outwardly with respect to the cylinder or tube 152 by its piston 155 sliding downwardly in the cylinder and compressing the spring 154. As soon as the motor is de-energized and the clutch disengaged and before the weight 164 begins to move downwardly, the piston 155 will be returned by the spring 154 to its position of Figure 24.

It will be readily apparent that the window 31 may be set either horizontally or vertically or at any desired angle and that the supporting structure of the shafts 50 and 51 may be likewise set at an angle so that the front flight of the curtain 56 will move transversely of the window, all without affecting the positioning of the actuating mechanism 70, due to the fact that such adjustments will be accommodated by the splined telescopic shafts 182 and the universal joints 181 and 183 at the ends thereof.

As seen in Figure 2, a contractile spring 263 is preferably provided for connecting the right hand ends of the levers 109 and 114 to assist in maintaining them in proper, substantially parallel relationship.

Various modifications and changes are contemplated and may obviously be resorted to, without departing from the spirit and scope of the invention as hereinafter defined by the appended claims.

I claim as my invention:

1. A changeable exhibitor comprising a supporting surface having an opening therein, an endless curtain or strip disposed behind said supporting surface and having indicia thereon a portion of which is visible through said opening, means mounted on said supporting surface and movably supporting said endless curtain, and an actuating unit detachably supported on the rear side of said supporting surface and connected to said means for moving the endless curtain and including driven escapement means constructed and arranged whereby the means for moving the endless curtain will be driven intermittently, said actuating unit also including a drum, a driven shaft connected thereto, a train of gears driven by said shaft for driving said means for moving the endless curtain, a cable having one end anchored to the drum and partially wound thereon and connected to a weight for rotating the drum in one direction for driving said gear train, a motor, clutch means for disengageably connecting the driven shaft of the motor to said drum for revolving the latter in the opposite direction for rewinding the cable thereon, and means actuated in response to the unwinding of the cable to a predetermined extent for causing the motor to be actuated and for moving the clutch to an engaged position.

2. A changeable exhibitor comprising a supporting surface having an opening therein, an endless curtain or strip disposed behind said supporting surface and having indicia thereon a portion of which is visible through said opening, means mounted on said supporting surface and movably supporting said endless curtain, and an actuating unit detachably supported on the rear side of said supporting surface and connected to said means for moving the endless curtain and including driven escapement means constructed and arranged whereby the means for moving the endless curtain will be driven intermittently, said actuating unit also including a drum, a driven shaft connected thereto, a train of gears driven by said shaft for driving said means for moving the endless curtain, a cable having one end anchored to the drum and partially wound thereon and connected to a weight for rotating the drum in one direction for driving said gear train, a motor, and clutch means for disengageably connecting the driven shaft of the motor to said drum for revolving the latter in the opposite direction for rewinding the cable thereon, and pawl and ratchet means disengageably connecting said shaft to the drum whereby the shaft will be caused to revolve with the drum when the cable is unwound therefrom and so that the drum will turn relatively to the shaft when actuated by the motor for rewinding the cable thereon.

3. A changeable exhibitor comprising a supporting surface having an opening therein, an endless curtain or strip disposed behind said supporting surface and having indicia thereon a portion of which is visible through said opening, means mounted on said supporting surface and movably supporting said endless curtain, and an actuating unit detachably supported on the rear side of said supporting surface and connected to said means for moving the endless curtain and including driven escapement means constructed and arranged whereby the means for moving the endless curtain will be driven intermittently, said actuating unit also including a drum, a driven shaft connected thereto, a train of gears driven by said shaft for driving said means for moving the endless curtain, a cable having one end anchored to the drum and partially wound thereon and connected to a weight for rotating the drum in one direction for driving said gear train, a spring motor for actuating said escapement means independently of said shaft and gears, and means connecting the driven shaft to the spring motor whereby the spring of the motor will be wound by the rotation of the driven shaft.

4. A changeable exhibitor comprising a supporting surface having an opening therein, an endless curtain or strip disposed behind said supporting surface and having indicia thereon a portion of which is visible through said opening, means mounted on said supporting surface and movably supporting said endless curtain, and an actuating unit detachably supported on the rear side of said supporting surface and connected to said means for moving the endless curtain and including driven escapement means constructed and arranged whereby the means for moving the endless curtain will be driven intermittently, said actuating unit also including a drum, a driven shaft connected thereto, a train of gears driven by said shaft for driving said means for moving the endless curtain, a cable having one end anchored to the drum and partially wound thereon and connected to a weight for rotating the drum in one direction for driving said gear train, and a spring motor for actuating said escapement means independently of said shaft and gears, and means for rewinding or loading said spring motor connected to and actuated by said shaft.

5. A changeable exhibitor comprising a supporting surface having an opening therein, an endless curtain or strip disposed behind said supporting surface and having indicia thereon a portion of which is visible through said opening, means mounted on said supporting surface and movably supporting said endless curtain, and an actuating unit detachably supported on the rear side of said supporting surface and connected to said means for moving the endless curtain and including driven escapement means constructed and arranged whereby the means for moving the endless curtain will be driven intermittently, said actuating unit also including a drum, a driven shaft connected thereto, a train of gears driven by said shaft for driving said means for moving the endless curtain, a cable having one end anchored to the drum and partially wound thereon and connected to a weight for rotating the drum in one direction for driving said gear train, and a spring motor for actuating said escapement means independently of said shaft and gears, and means for rewinding or loading said spring motor connected to and actuated by said shaft, and clutch means interposed between said shaft and the spring motor constructed and arranged to release in response to an overloading or overwinding of the spring motor.

6. In an actuating mechanism for movable, changeable exhibitors, a driven shaft, a driving connection between said shaft and the changeable exhibitor, a drum mounted on said shaft, a cable partially wound on and anchored at one end thereof to the drum, a weight connected to the opposite end of said cable for revolving the drum in one direction, pawl and ratchet means for causing said shaft to be revolved with the drum when actuated by said weight, a motor, a clutch disengageably associated with said drum, gearing connecting said motor to the clutch, and means actuated in response to the unwinding of said cable to a predetermined extent for causing said motor to be actuated and for moving the clutch to an engaged position for rewinding the cable on the drum, said drum turning relatively to said shaft by the releasement of the pawl and ratchet means, and said last mentioned means being operable in response to the rewinding of the cable to a predetermined extent for disengaging the clutch and for rendering the motor inoperative.

7. An actuating mechanism or means as in claim 6, and escapement means driven continuously indirectly from the power derived from the rotation of the drum and shaft in response to the unwinding of the cable and constructed and arranged to cause said shaft to be rotated intermittently with the drum for intermittently actuating the changeable exhibitor.

8. An actuating mechanism or means as in claim 6, and escapement means driven continuously indirectly from the power derived from the rotation of the drum and shaft in response to the unwinding of the cable and constructed and arranged to cause said shaft to be rotated intermittently with the drum for intermittently actuating the changeable exhibitor, a spring interposed in the driving connection between said shaft and escapement means for directly driving the latter, said spring being rewound by the intermittent movement of the drum and shaft.

9. An actuating mechanism or means as in claim 6, and escapement means driven continuously indirectly from the power derived from the rotation of the drum and shaft in response to the unwinding of the cable and constructed and arranged to cause said shaft to be rotated intermittently with the drum for intermittently actuating the changeable exhibitor, said escapement means including a second, continuously driven shaft having spaced collars keyed thereto and provided with inturned flanges of different diameters, said flanges being provided with staggeredly arranged notches, a shaft driven by said first mentioned shaft and connected to the changeable exhibitor and having an arm projecting therefrom for movement through the notches of said flanges, said arm being adapted to ride over portions of the exterior surface of the smaller collar flange and into engagement with a notch thereof for movement therethrough to permit said last mentioned shaft to rotate approximately 180° and for positioning said arm in engagement with the interior of a portion of the other collar flange to be retained thereby until the arm is in registry with a notch thereof, whereby said last mentioned shaft will be permitted to revolve intermittently for actuating the changeable exhibitor.

10. In an actuating mechanism for a movable changeable exhibitor, a driven shaft adapted to be connected to a changeable exhibitor for driving the latter, a drum shaft, gearing connecting said driven shaft and drum shaft, a drum mounted on said drum shaft, weight actuating means for rotating the drum and drum shaft in one direction for revolving said driven shaft, escapement means for interrupting the rotation of the driven shaft, drum and drum shaft, whereby to drive the changeable exhibitor intermittently, spring means for driving said escapement means continuously, and means connecting said drum shaft to said spring means whereby the intermittent rotation of the drum shaft will rewind the spring means.

11. An actuating mechanism as in claim 10, and a clutch interposed between said drum shaft and spring means and constructed and arranged to release automatically in response to an overloading of the spring means.

12. An actuating mechanism as in claim 10, and a clutch interposed between said drum shaft and spring means and constructed and arranged to release automatically in response to an overloading of the spring means, and a timing mechanism interposed between said spring means and escapement means for regulating the speed of rotation of the latter.

13. An actuating mechanism as in claim 10, and a clutch interposed between said drum shaft and spring means and constructed and arranged to release automatically in response to an overloading of the spring means, and a timing mechanism interposed between said spring means and escapement means for regulating the speed of rotation of the latter, said timing mechanism including lugs in overlying relationship and connected to relatively rotatable parts of the escapement means and timing mechanism whereby when said lugs are in one relative position the escapement means will be driven by the timing mechanism, said escapement means including a cam carried by the driven shaft for advancing the escapement means relatively to the timing mechanism at the instant of release of the driven shaft for causing the lug carried by the escapement means to momentarily move at a more rapid speed than the lug of the timing mechanism to be thereby advanced out of engagement therewith.

14. An actuating mechanism as in claim 10, and a clutch interposed between said drum shaft and spring means and constructed and arranged to release automatically in response to an overloading of the spring means, an electric motor forming a part of said actuating mechanism, a source of electric current forming a self-contained part of the actuating mechanism, a gear driven by the electric motor and rotatably disposed on the drum shaft and provided with a splined hub, a clutch splined to said hub for engaging said drum, and means actuated in response to a predetermined rotation of the drum under the impulse of its actuating weight for closing a circuit between said self-contained source of electric current and electric motor for driving said gear and for moving the clutch into an engaged position with the drum for rotating the drum in the opposite direction, said last mentioned means being actuated in response to the raising of the weight to a predetermined point for interrupting the circuit between the electric source and electric motor and for returning the clutch to a released position, and pawl and ratchet means interposed between the drum and drum shaft to permit the drum to revolve relatively to the drum shaft when actuated by said motor.

15. An actuating mechanism as in claim 10, said driven shaft including a telescopic section having universal joints at each end thereof whereby the changeable exhibitor when disposed at any angle with respect to said actuating mechanism will be in a position to be driven thereby.

FOSTER HARNESS.

REFERENCES CITED

The following references are of record in the file of this patent:

UNITED STATES PATENTS

| Number | Name | Date |
| --- | --- | --- |
| 2,167,838 | Hand | Aug. 1, 1939 |

FOREIGN PATENTS

| Number | Country | Date |
| --- | --- | --- |
| 387,134 | Great Britain | Feb. 2, 1933 |